United States Patent [19]

van der Lely

[11] Patent Number: 4,560,211
[45] Date of Patent: Dec. 24, 1985

[54] TRACKED VEHICLES HAVING GROUND ENGAGING PROFILES

[76] Inventor: Cornelis van der Lely, 7, Brüschenrain, Zug, Switzerland

[21] Appl. No.: 441,267

[22] Filed: Nov. 12, 1982

Related U.S. Application Data

[63] Continuation of Ser. No. 207,341, Nov. 17, 1980, abandoned, which is a continuation of Ser. No. 900,157, Apr. 26, 1978, abandoned.

[30] Foreign Application Priority Data

Jun. 30, 1977 [NL] Netherlands ............... 7707261

[51] Int. Cl.$^4$ ............................................. B62D 55/26
[52] U.S. Cl. ................................. 305/35 EB; 305/38
[58] Field of Search ............ 305/35 EB, 38, 54, 35 R; 301/41 R, 44 R, 44 T

[56] References Cited

U.S. PATENT DOCUMENTS

| 1,487,416 | 3/1924 | Whitlock | 305/54 |
|---|---|---|---|
| 1,639,536 | 8/1927 | Saives . | |
| 2,064,890 | 12/1936 | Dorst | 305/35 EB |
| 2,998,998 | 9/1961 | Hyler et al. | 305/35 EB X |
| 3,390,924 | 7/1968 | Bumbaugh | 305/35 EB |
| 3,604,763 | 9/1971 | Maguire | 305/35 EB |
| 3,830,551 | 8/1974 | Masaoka et al. | 305/35 EB X |

FOREIGN PATENT DOCUMENTS

| 1117612 | 5/1956 | France . | |
|---|---|---|---|
| 727102 | 1/1969 | France | 305/35 EB |
| 278779 | 10/1927 | United Kingdom . | |

Primary Examiner—David A. Scherbel
Attorney, Agent, or Firm—Pravel, Gambrell, Hewitt & Kimball

[57] ABSTRACT

An endless tract for a tractor having steerable forward wheels and rear twin wheels on each side in tandem, the endless track received by each pair of rear twin wheels. The track has a plurality of embedded bars or strips, each of which is formed with inwardly directed projections, has the shape of an inverted blunted V and is arranged to be received between the pneumatic tires of the twin wheels. Connected on the outside of the endless belts to the interior bars by bolts are transverse ridges extending across the belt and being profiled so as to be inclined downwardly and forwardly relative to the ground whereby the ridges in operation exert traction in the ground in a downwardly inclined direction, the ridges being made of rubber-like material or steel or both and the inclination of the ridges between 20° and 45° relative to the overlying belt and the ground's surface.

3 Claims, 10 Drawing Figures

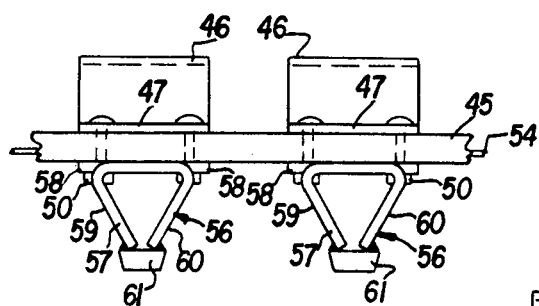
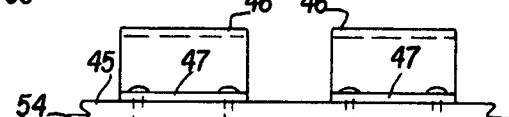
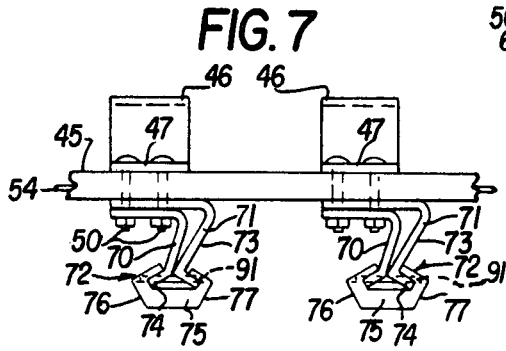
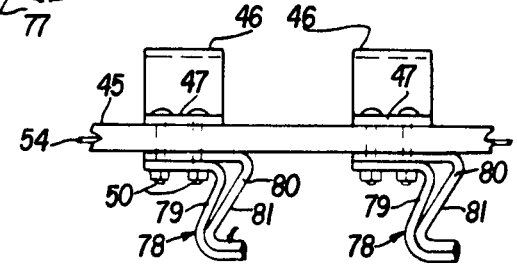
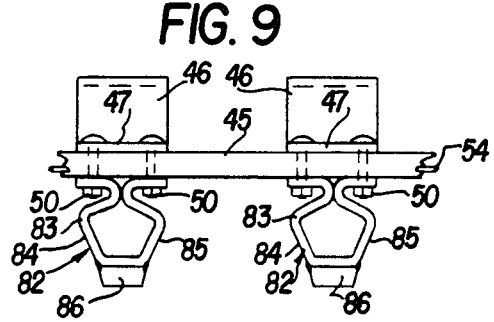
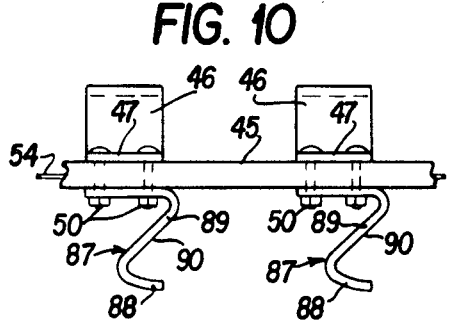

4,560,211

TRACKED VEHICLES HAVING GROUND ENGAGING PROFILES

RELATED APPLICATION

This is a continuation of Ser. No. 207,341, filed Nov. 17, 1980 which is a continuation of Ser. No. 900,157, filed Apr. 26, 1978, both now abandoned.

SUMMARY OF THE INVENTION

The invention relates to endless tracks for vehicles, such for example, as tractors, trucks, motorcars, vehicular soil cultivating machines trucks, wagons or the like, of the kind which comprise at least one endless tread track arranged around wheels of the vehicle.

According to the invention the track comprises ridges inclined to a belt, forming part of the track is such a way that the belt can exert an advancing force on the ground when the vehicle is in use.

For a better understanding of the invention, and to show how the same may be carried into effect, reference will be made, by way of example, to the accompanying drawings, in which:

BRIEF DESCRIPTION OF THE DRAWINGS

FIGS. 5 to 10 show alternative embodiments of parts of flexible endless tread tracks as seen in the direction of the arrows III—III in FIG. 2 and to the same scale as FIG. 3.

DESCRIPTION OF THE PREFERRED EMBODIMENTS

Figure 1:
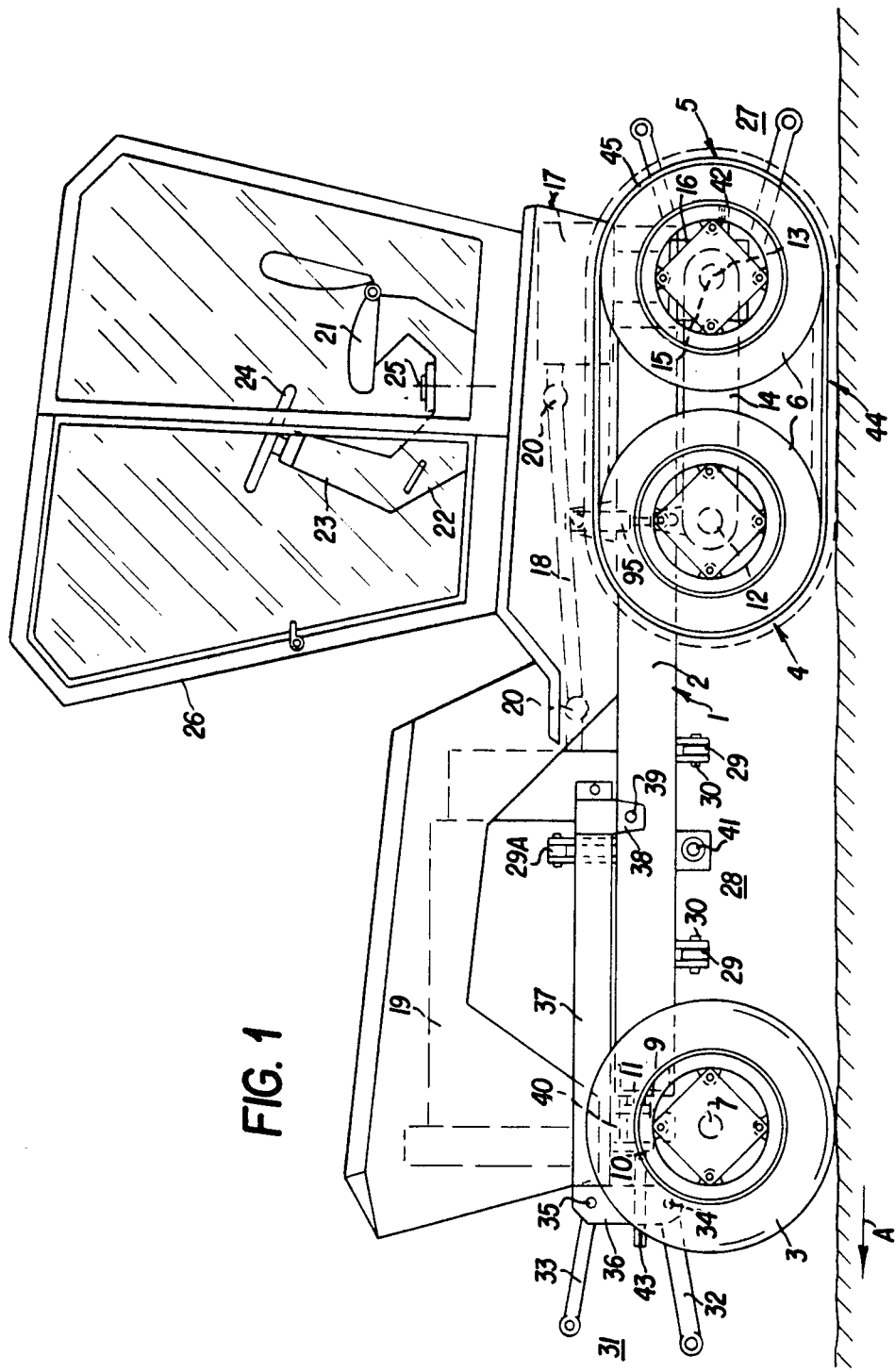
FIG. 1 is a side elevation of a tractor in a preferred embodiment of the invention.
Figure 2:
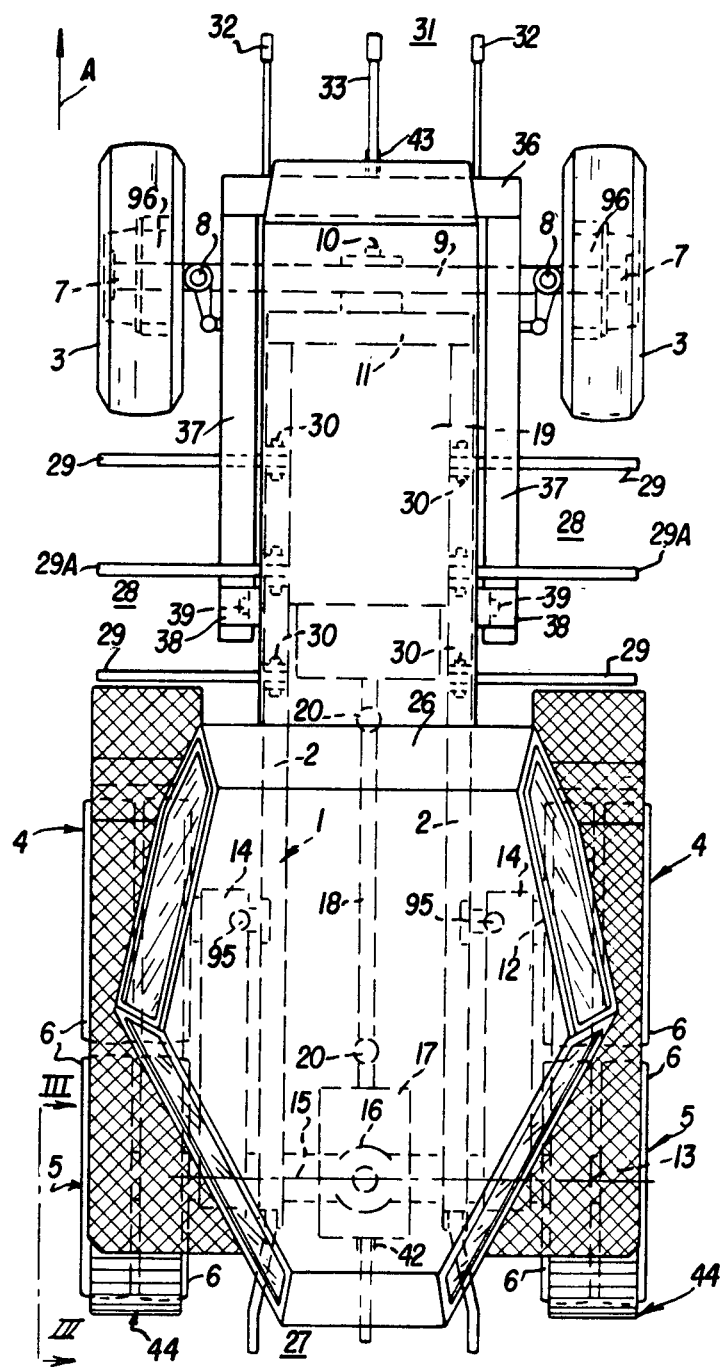
FIG. 2 is a plan view of the tractor of FIG. 1.

An embodiment of a tractor having an endless tread track in accordance with the invention comprises a frame 1 (FIGS. 1 and 2) having two substantially horizontal and relatively parallel frame beams 2, supported by steerable front wheels 3 and two pairs of rear wheels 4 and 5 arranged one behind the other on either side of the tractor. The two foremost rear wheels 4 on one side of the tractor frame and the hindmost rear wheels 5 located in line behind the wheels 4, viewed in the direction A, are provided with tires 6 having conventional shapes and treads. Also, the front wheels 3 are provided with tires. The diameter of each of the foremost rear wheels 4 is substantially equal to that of the hindmost rear wheels 5. In this embodiment the diameter of the front wheels 3 is equal to that of the rear wheels 4 and 5, but it may be larger or smaller than the latter. Wheel axles 7 of the front wheels 3 are connected through steerable pivot pins or king pins 8 to a front axle beam 9 which extends perpendicular to the direction A and which is freely pivotable in a vertical plane of substantial symmetry of the tractor about a horizontal pivotal shaft 10 extending in the direction A and being journalled in a support fastened to a transverse beam 11 which interconnects the front ends of the frame beams 2. As seen in FIG. 1, the pivotal shaft 10 is disposed approximately midway between top and bottom of the transverse beam 11. The axles 12 of the foremost rear wheels 4 and the axles 13 of the hindmost rear wheels 5 are supported, on one side of the tractor, in a beam 14 extending parallel to the direction A and being located alongside the neighboring frame beam 2. The supporting beam 14 is freely pivotable about a pivotal shaft 15 coinciding with the center line of the corresponding rearmost wheel axle 13. The wheel axles 13 are pivotally journalled on the bottoms of the frame beams 2. The two supporting beams 14, together with the rear wheels connected thereto, are pivotable about the shaft 15. The foremost rear wheels 4 are freely rotatable about the wheel axles 12. The two wheel axles 13 are extended in the space between the two supporting beams 14 and are coupled together by a differential 16 which has an upwardly extending input shaft coupled with the output shaft of a torque converter 17, the latter being pivotable to a limited extent relative to the tractor frame 1 and being connected thereto. The torque converter 17 is located, as seen in FIG. 1, wholly or partly above the hindmost rear wheels 5. The drive link between the output shaft of the torque converter 17 and the input shaft of the differential 16 is telescopic with regard to potential movements of the supporting beams 14. The torque converter 17 may comprise two pairs of adjustable wheel discs which are coupled with one another by a chain so that, by a relative displacement of each of the pairs of wheel discs a continuously variable transmission can be achieved. The torque converter 17 comprises an input shaft which can be driven via an auxiliary shaft 18 by the tractor engine 19, the auxiliary shaft 18 preferably being a telescopic shaft having two universal joints 20 to allow relative movements of the torque converter 17 and the tractor engine 19.

The front wheels 3 are steerable from a driver seat 21, which is located, as seen in FIG. 1, above the tops of the rear wheels 4 and 5 and, viewed in an plan, (FIG. 2) in the position shown in FIG. 1, between the wheel axles 12 and 13. The driver seat 21 is secured to a console 22 to which is furthermore fastened a column 23 holding the steering wheel 24 and all further steering and control members. The assembly of the seat 21, the console 22, the column 23, the steering wheel 24 and all steering and control members is pivotable as a whole about the axis of a substantially vertical pivotal shaft 25 located in the vertical plane of substantial symmetry of the tractor and can be fixed in either one of two positions which are angularly spaced by 180° so that the front of the seat 21 may face in the direction A or opposite the same. The driver seat 21 is housed in a cabin 26 located as seen in FIG. 1, above the rear wheels 4 and 5.

At the rear of the tractor shown in FIG. 1, there is provided a three-point lift 27 hydraulically actuable from the driver seat 21. Further lifts 28 are arranged on both sides of the tractor on the parts of the frame beams 2 which are located between the rear of the front wheels 3 and the front of the rear wheels 4, the lower lifting arms thereof being connected to the bottom of the frame beams 2 and being hydraulically pivotable from the driver seat 21 via a horizontal pivotal shaft 30 extending in the direction A. An upper lifting arm 29A of each lift 28 bears on the top of the corresponding frame beam 2.

A front three-point lift 31 comprises lower lifting arms 32 and an upper lifting arm 33 arranged to pivot about substantially horizontal shafts 34 and 35 extending perpendicular to the direction A and being journalled in a support 36 located at a short distance in front of the front axle beam 9. The lift 31 can also be actuated hydraulically from the driver seat 21. The support 36 is fastened to two arms 37 extending to the rear from the support 36. Each of the arms 37 is located, as seen in FIG. 1, at a short distance above the top of the neighboring frame beam 2 and, viewed in plan, on the outer side of the adjacent frame beam 2. Near the rear ends of the arms 37 which are located, viewed in plan, approximately midway across the space between the wheel axles 7 and 12, fastening lugs 38 are provided on said arms 37 for holding horizontal pivotal shafts 39 which extend perpendicular to the direction A. Each of the pivotal shafts 39 is fastened to the side of the neighboring frame beam 2. The joint between each pivotal shaft 39 and the relevant lug 38 is preferably movable, for example, by means of a ball bearing arranged in a comparatively large rubber support socket in the lug 38. At a short distance behind the support 36, the bottom of each arm 37 bears on the top of the front axle beam 9 and between the bottom of each arm 37 and the top of the front axle beam 9 a rubber support 40 may be provided. An undesirable upward displacement or either arm 37 with respect to the front axle beam 9 is prevented by a stop (not shown), which may be formed by a bolt passed vertically through the arm 37 and being fastened in the front axle beam 9, said bolt having a head or stop plate at the top which bears on the top of the arm 37 concerned. It is thus ensured that the lift 31 follows the movements of the front axle beam 9 so that a machine or tool attached to the lift 31 will follow the unevennesses of the ground independently of the movements of the tractor frame 1. The tractor frame 1 follows, in general, movements of the rear wheels in lateral and upward directions, and wheels being, however at a relatively large distance behind any tool or machine attached to the front lift 31. The disposition of the lift 31 is preferably such that any tool or machine attached thereto is located at a short distance in advance of the front wheels 3. Since the front of the tractor frame has, in general, a comparatively light structure, the lift 31 is disposed so that it hardly loads the frame because it bears, on the one hand, directly on the front axle beam 9, and on the other hand, at a place on the tractor frame 1 which is located at a distance behind the front wheels, while the pivotal shafts 39 usually exert upwardly directed forces on the frame beams 2. The lift 31 may, therefore, be the same as is mounted on standard tractors.

Near each side lift 28, a power take-off shaft 41 extends substantially horizontally perpendicular to the direction A and is driven with the engine speed. Near the rear lift 27, and also near the front lift 31 are preferably also provided power take-off shafts 42 and 43.

Figure 3:
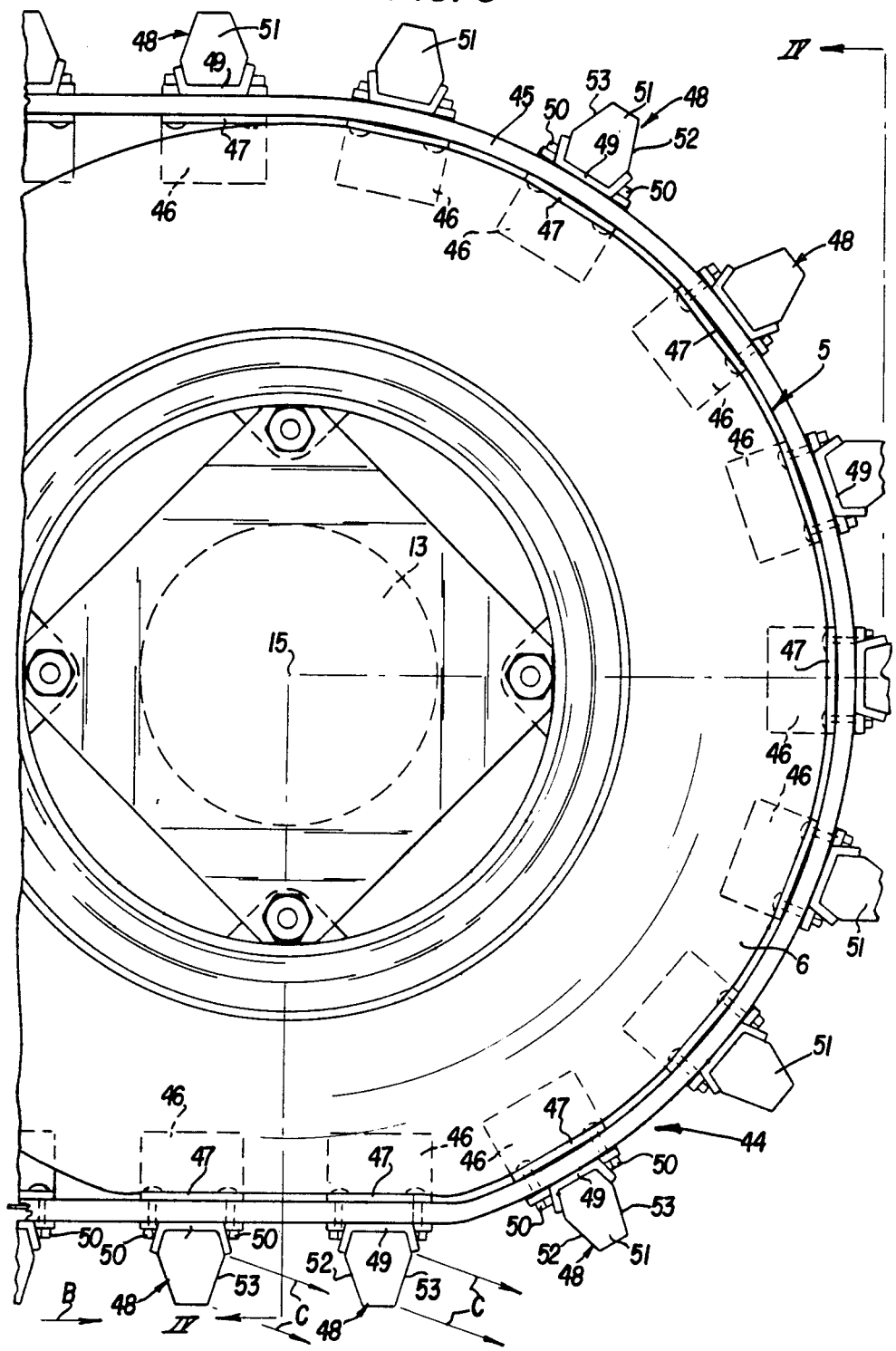
FIG. 3 is a side elevation, to an enlarged scale, of part of the rear of the tractor as seen in the direction of the arrows III—III in FIG. 2.
Figure 4:
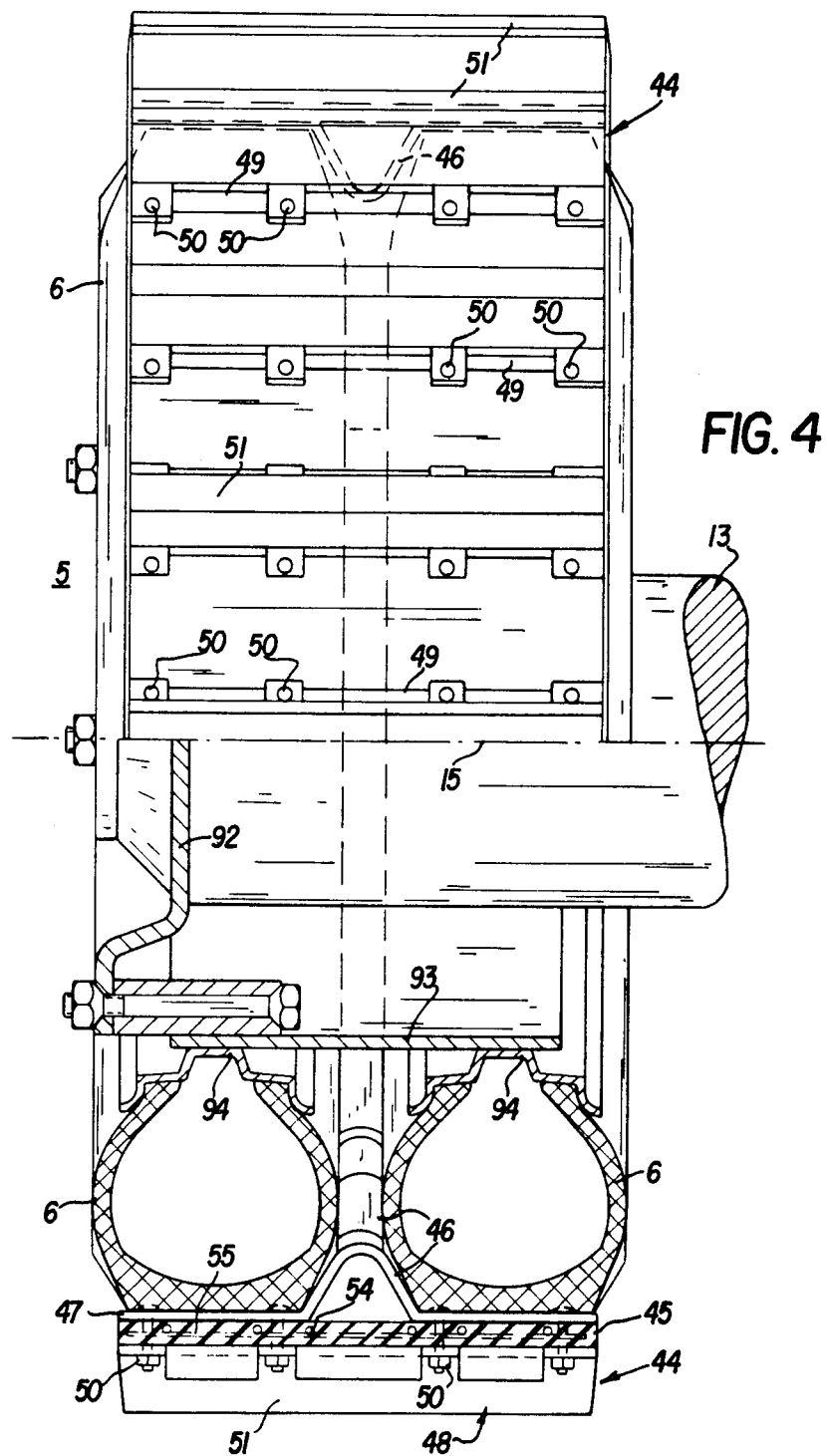
FIG. 4 is a part sectional elevation taken on the lines IV—IV in FIG. 3.

From FIGS. 3 and 4 it is apparent that an endless tread track 44 is arranged around the treads of the tires 6 of the two pairs of wheels 4 and 5 on each side of the tractor. Each track 44 comprises an endless belt 45 having a width approximately corresponding with the width of two of the neighboring wheels 4 or 5. Each belt 45 is provided on its inner surface facing the wheels 4 and 5 with a large number of equidistant teeth or cams 46 which are arranged in a row that is parallel to the direction of length of the belt 45. Considered in the direction of length of the belt (FIG. 4) each tooth or cam 46 is symmetrically disposed in a vertical plane of symmetry of the belt 45. As seen in FIG. 4, each cam 46 has the shape of an inverted V, the side faces of which converge from the belt 45, the apex being rounded off. Viewed in the direction of length of the belt 45 (FIG. 4), the dimensions of each tooth or cam 46 are such that it fits between the side faces of two tires 6 which adjoin the treads thereof. Any cam 46 engaging the wheels 4 or 5 is thus located between the radially outer parts of two neighbouring tires 6 and is shaped so that it is in contact with the profiles or patterns on the two sides of those tires. The contact pressure is such that, in the case of a driven wheel, the tires can move along the cams and hence the further parts of track 44. Each tooth or cam 46 forms part of a steel strip 47 convering the whole width of the belt 45, said strip 47 being bent upwards, in accordance with the shape of the cam, on either side of the vertical plane of symmetry of the belt 45. Viewed from one side (FIG. 3), each tooth or cam 46 has a rectangular shape. The width of each cam 46 and of the strip 47, viewed from one side is larger than the distance between two neighboring strips 47 and is equal to that of each strip 47.

On the outer surface remote from the wheels 4 and 5, the belt 45 has a large number of transverse ridges 48 covering the whole width of the belt 45. Each ridge 48 is preferably located directly opposite a tooth or cam 46 on the other side of the belt. The height of each transverse ridge or profile 48 exceeds its width, viewed from one side. Each ridge or profile 48 of the embodiment shown in FIG. 3, comprises a metal holder 49 essentially having the shape of an inverted U, the web of which is in contact with the belt 45, whereas the two limbs diverge away from the belt 45. The two limbs of each holder 49 are interrupted, in this embodiment, at four places, since, at each of these places, the limbs are bent back by punching into the plane of the web of the holder 49 so that these bent-back parts also engage the belt 45 (FIGS. 3 and 4). These bent-back parts of the limbs of the holder 49 constitute lugs and are formed with holes through which bolts 50 are passed. The bolts 50 are also passed through holes in the strip 47 and in the belt 45 so that the bolts 50 (eight for each holder 49) clamp together the strip 47, the belt 45 and the holder 49.

Each holder 49 is provided, by vulcanization, with a rubber profile 51. Each profile 51 covers the whole width of the belt 45. Viewed from one side (FIG. 3), each profile 51 has an irregular hexagonal cross-section but is shaped symmetrically with respect to a plane of symmetry at right angles to the length of the belt 45. The part of each profile 51 located near the belt 45 has a shape corresponding with that of the holder 49, whereas the part of the profile 51 which projects from the holder 49, when viewed perpendicular to the direction A, has boundary surfaces 52 and 53 extending at right angles to said direction (FIG. 3) which surfaces are in inclined positions relative to a local part of the belt 45. The surfaces 52 and 53 are each at an angle of about 20° to a plane which is at right angles to the local part of the belt 45 and to the vertical plane of substantial symmetry of the tractor so that outwardly extending lines perpendicular to said surfaces extend forwardly and rearwardly respectively and are inclined downwardly. As shown in FIG. 3, the height of each profile 51 exceeds its width. The heads of the bolts 50 lie on the inner surfaces of the strips 47 and are located, as is shown in FIG. 4, beneath the treads of the tires 6, whereas the nuts screwed onto the bolts 50 are in engagement with the outer surfaces of the lugs which are punched from the limbs of the holders 49.

The belt 45 is made from flexible material, such as synthetic resin or rubber, and comprises liners formed by endless steel wires 54 extending in the direction of length of the belt 45 and steel wires 55 fastened to the former end extending in the direction of width of the belt 45, thus forming a network with the steel wires 54. The bolts 50 are passed through holes in the belt 45 which register with openings of the network.

In the embodiment shown in FIG. 5, transverse ridges 56 on the outer surface of the belt 45 comprise metal profiles 57 having substantially the shape (FIG. 5) of isosceles triangle. The profiles 57 are formed by strips of bent steel sheet from which fastening lugs 58 are punched to receive the bolts 50. Foremost and hindmost boundary surfaces 59 and 60 respectively of the profiles 57 are in this embodiment each at an angle of about 30° to a plane which is at right angles to the belt 45 and also to a plane at right angles to the longitudinal plane of symmetry of the tractor. Perpendiculars to these boundary surfaces 59 and 60 as seen in FIG. 5 extend forwardly and rearwardly in downward directions. The parts of each profile 57 that are remote from the belt 45 have a wear-resistant steel strip 61 welded to them which covers approximately the whole width of the belt 45 like the profiles 57. Each strip 61 is also tapering, viewed from one side and converges in a downward direction in the position shown in FIG. 5.

FIG. 6 shows transverse ridges 62, the profiles of which are fastened by the bolts 50 to the belt 45 and are essentially shaped like the profiles 57, the outer ends 64 thereof being, however, bent outwardly so as to diverge in a downward direction. These outer ends 64 are each enclosed by a symmetrical, channel-like profile 65 of steel, serving as a wear resistant element like the strip 61. Considered in the direction A, foremost and rearmost boundary surfaces 66 and 67 are, in this embodiment each at an angle of about 30° to a plane which is at right angles to the strip 47 and also to a plane at right angles to the longitudinal plane of substantial symmetry of the tractor, and, as seen in FIG. 6, perpendiculars to said surfaces extend forwardly and rearwardly respectively and in a downward direction in both cases. The steel profile 65 also has foremost and rearmost boundary surfaces 68 and 69 that are both disposed in an inclined position relative to the aforesaid reference plane, the angle to said plane being about 30° in this embodiment.

In the embodiment shown in FIG. 7, two separate profiles 70 and 71 which partly contact one another are fastened by the bolts 50 to the belt 45, said profiles forming part of a transverse ridge 72. The limbs of the two metal profiles 70 and 71 are clamped against the outer surface of the belt 45 and said limbs which are directed outwardly with respect to the belt 45, are both disposed, considered in the direction A, on one side (that is to say the rear side) of the strip 47 as seen in FIG. 7. The profiles 70 and 71 extend outwardly and are slightly bent forwardly in the direction A, while a rear boundary surface 73 of the trailing profile 71, considered in the direction A, is at an angle of substantially 40° to a plane which is at right angles to the strip 47 and to the plane of symmetry of the tractor, the perpendicular to said plane being inclined rearwardly and downwardly as seen in FIG. 7. The ends 74 of the profiles 70 and 71 which are remote from the belt 45 are welded together and are formed so as to diverge outwardly. These bent ends 74 are embraced by a rubber profile 75 approximately shaped in the form of a gutter and clamping around the bent ends 74. The profile 75 also has leading and rear boundary surfaces 76 and 77 respectively which surfaces are also at an angle of 40° to said reference plane, and, as seen in FIG. 7, perpendiculars thereto extend forwardly and rearwardly respectively and in downwardly inclined directions in both cases.

In the embodiment shown in FIG. 8, a transverse ridge 78 is formed by profiles 79 and 80 made from steel strips in a similar manner to the profiles 70 and 71 of the preceding embodiment. However, the contacting ends remote from the belt 45, are both bent in a rearward direction, with respect to the direction A, and are parallel to the belt 45 where they are welded to one another. The rear boundary surface 81 of the rear profile 80, with respect ot to the direction A, is at an angle of substantially 40° to the aforesaid reference plane, the perpendicular thereto extending rearwardly and downwardly as seen in FIG. 8. The rearwardly extending end parts of the profiles 79 and 80 constitute wear-resistant and supporting faces for the track in the same way as the rubber profile 75 of the preceding embodiment. Each transverse ridge 78 has essentially the shape of a hook.

The embodiment shown in FIG. 9 comprises transverse ridges 82, the profiles 83 of which are formed by steel sheet bent into a shape such that each profile 83 has a plane of symmetry which is perpendicular to the plane of the corresponding strip 47 and also perpendicular to the direction of length of the belt 45. The bell-like cross-section of each profile 83 has a front boundary surface 84 and a rear boundary surface 85 both of which are at an angle of substantially 30° to a plane that is at right angles to the strips 47 and also at right angles in the vertical longitudinal plane of substantial symmetry of the tractor. Perpendicular lines to the surfaces 84 and 85 extend forwardly and rearwardly respectively, and as seen in FIG. 9 in both cases in downwardly inclined directions. The lower boundary of each profile 83 is provided with a hardened steel strip 86, the front and rear boundary surfaces of which strip form extensions of the surfaces 84 and 85 respectively.

In the embodiment shown in FIG. 10, a transverse ridge 87 is clamped by the bolts 50 against the belt 45 and is of substantially S-shaped form, a lower flange-like bend 88 extending to the rear with respect to the direction A. The flange 88, together with an outwardly extending profile part 89, forms a cavity orientated to the rear with respect to the same direction. The profile part 89 has a rear boundary surface 90 which is at an angle of substantially 45° to a plane which is at right angles to the associated strip 47 and to the longitudinal plane of substantial symmetry of the tractor. The perpendicular to the surface 90 as seen in FIG. 10 extends rearwardly in a downwardly inclined direction A.

All of the transverse ridges shown in these embodiments cover the whole width of the belt 45. As in the embodiment shown in FIG. 3, the height of each transverse ridge in the embodiments of FIGS. 5 to 10 exceeds the width thereof. All of the transverse ridges shown are releasably secured to the belt by the bolts 50.

In the embodiments of FIGS. 6 and 7, the profiles 65 and 75, which form wear-resistant elements of the transverse ridges, can be releasably fastened by pins 91 to the profiles 63 and 70, 71, respectively.

During operation, the tractor engine 19 drives only the wheel axles 13 of the hindmost rear wheels 5 via the auxiliary shaft 18, the variable torque converter 17 and the differential 16. With a direction of rotation of the rear wheels 5 corresponding with the direction of forward travel A of the tractor, the driving moment of each wheel axle 15 is transmitted through a wheel disc 92 (FIG. 4) to a wheel flange 93 provided with rims 94 for the tires 6. When the wheels 5 are driven, the tires 6 entrain the cams 46 which are gripped between the profiles of the sides of the tires 6 so that tracks 44 are turned. The foremost rear wheels 4 are driven solely by tracks 44. In this situation the tractive run of each track 44 is in contact with the ground during travel in the direction A and it is vigorously drawn to the rear with respect to the ground by the driving moment of the hindmost rear wheel 5, (direction B, FIG. 3) so that parts of track 44 exert rearwardly and downwardly inclined forces on the upper layer of the ground (see the arrows C in FIG. 3). The forces in the direction C are exerted by the boundary surfaces 53, 60, 67, 69, 73, 77, 81, 85 and 90 (FIGS. 3 to 10). If these boundary surfaces were at right angles to the associated strip 47, the upper ground layer would be scraped off at an increase in tractive force so that tracks 44 would skid. However, the transverse ridges in the embodiments shown penetrate into the ground so that the force exerted on the ground by said sloping boundary surfaces is distributed over a comparatively large area resulting in a downwardly inclined field of force to the rear in the ground, whereby in agriculture, a harmful packing of the soil surface is avoided. By their inclined pressure surfaces, the transverse ridges provide a very large ground contact area while the downwardly inclined pressure distribution in the ground prevents premature skidding or slipping of tracks 44 in the case of a heavy force, and a disadvantageous soil structure is avoided. In this way a tractor of high power and low weight can be obtained, which will preserve the soil structure. It will also be understood due to the inclined pressure surfaces 53 of ridges 48 and the limited flexibility of belt 45, inherent from its structure and materials, with sufficient forces being exerted at each surface 53, the reaction thereto causes each ridge to tilt somewhat thus decreasing its inclination relative to the ground and increasing the downward component of forces acting in direction C.

Each assembly of two wheel pairs 4 and 5, the corresponding track 44 and the adjacent supporting beam 14 is coupled, via the effectively single uninterrupted axle 13 of the rear wheels 5, with the assembly on the other side of the tractor. Both assemblies are pivotable with respect to the tractor frame 1 about the center line 15 of the uninterrupted axle 13. Near the front of the two supporting beams 14, upwardly extending hydraulic cylinders 95 are provided which can be actuated from the driver seat 21. The top of each hydraulic cylinder 95 is pivoted to the frame 1 and the bottom of each cylinder is pivoted to the top of the corresponding supporting beam 14 near the associated wheel axle 12. In normal operation, the two hydraulic cylinders 95 are hydraulically fixed so that each supporting beam 14 and the wheel pairs 4 and 5 and the corresponding track 44 are in bodily fixed positions relative to the further parts of the tractor, it being ensured that all transverse ridges on the tractive run of each caterpillar track 44 are in contact with the ground in the manner described above. By a common actuation of the hydraulic cylinders 95, the two aforesaid assemblies can be turned about the pivotal axis 15 and be fixed in a plurality of positions, which is particularly important when the tractor is steered by the front wheels 3 through a bend, when the contact surface with the ground is reduced.

The wear-resistant elements 61, 65, 75, and 86 are particularly important when driving along hardened roads. In order to avoid slipping and skidding on roads during braking operations, when the traction of the steel wear-resistant elements 61, 65 and the outermost parts of the transverse ridges 78, 86 and 88 reduced, the front wheels 3 of the tractor are provided with brakes 96.

A similar track structure may be employed if the tractor frame is equipped with only two consecutive rear wheels on each side. In such a case, each belt 45 has two rows of teeth or cams 46, which can each be brought into contact with one tire.

The steps described above may be applied not only to tractors but also to vehicles operating under similar conditions, for example, motor-trucks, soil cultivating machines, field wagons, tool carriers and the like.

It is to be understood that inventive concepts are not limited to the foregoing description and descriptive matter in the following claims, but also may cover the details of the Figures whether described or not described.

I claim:

1. An agricultural vehicle included in the group which comprises tractors, soil cultivating machines, and the like which include a lifting device, the vehicle comprising an engine and power train extending therefrom, said vehicle having a track arranged around at least two pneumatic tires mounted on ground wheels of the vehicle which are arranged in tandem, the axles of said wheels supported in a beam whereby the distance between said axles is constant, said track comprising a belt having a width which is uninterrupted for at least the entire width of said tires' tread and a plurality of outwardly extending profiles and inwardly extending teeth mounted thereon, each said profile consisting entirely of metal and as viewed from the side having a height which exceeds its width, each said profile being S-shaped with the lower leg of the "S" being flat and extending substantially parallel to the portion of said belt from which it extends, said teeth engaging said tires for driving said track and, viewed from one side, the width of each of said teeth being larger than the distance between two adjacent said teeth, each of said teeth rigidly connected to one of said profiles, only the rearmost of said ground wheels being connected to said power train whereby it is driven by said engine and the forward of said ground wheels is driven by said belt, said belt being embedded with longitudinally extending steel wires of such a character that it is relatively inelastic in the longitudinal direction, said belt being in a state of tension wherever it contacts the ground when said vehicle is being driven forward and said profiles exerting rearwardly and downwardly inclined forces on the upper layer of the ground of such a character that packing of the soil is substantially reduced.

2. A track for an agricultural vehicle included in the group which comprises tractors, soil cultivating machines, and which include a lifting device, an engine and power train extending therefrom, at least two pneumatic tires mounted on the vehicle's ground wheels which are arranged in tandem, the axles of said wheels supported in a beam whereby the distance between said axles is constant, the track comprising a belt arranged around said pneumatic tires and having a width which is uninterrupted for at least the entire width of said tires' tread, a plurality of outwardly extending profiles and inwardly extending teeth mounted on said belt, said profiles consisting entirely of metal and being hook-shaped when viewed from the side, said teeth engaging said tires for driving the track and, viewed from one side, the width of each of said teeth being larger than the distance between two adjacent said teeth, each of said teeth rigidly connected to one of said profiles, only the rearmost of said ground wheels being connected to said power train whereby it is driven by said engine and the forward of said ground wheels is driven by said belt, said belt being embedded with longitudinally extending steel wires of such a character that it is relatively inelastic in the longitudinal direction, when the vehicle is moving forward said belt contacting the ground and being in a state of tension where it so contacts the ground and said profiles penetrating into the ground so that their rearwardly and downwardly inclined forces exerted on the soil in the upper layer of the ground are of a character that harmful packing which causes a disadvantageous soil structure is substantially reduced and scraping off of its upper layer is generally avoided.

3. A track for an agricultural vehicle included in the group which comprises tractors, soil cultivating machines, and which include a lifting device, an engine and power train extending therefrom, at least two pneumatic tires mounted on the vehicle's ground wheels which are arranged in tandem, the axles of said wheels supported in a beam whereby the distance between said axles is constant, the track comprising a belt arranged around said pneumatic tires and having a width which is uninterrupted for at least the entire width of said tires' tread, a plurality of outwardly extending profiles and inwardly extending teeth mounted on said belt, each said profile having a substantially coplanar and soil contacting side which has an inclination relative to a line perpendicular to said belt in a range of about 20° to 45° as seen from the side, said profiles being S-shaped with the lower leg of the "S" extending substantially parallel to the portions of said belt from where the corresponding said profile extends, said teeth engaging said tires for driving the track and, viewed from one side, the width of each of said teeth being larger than the distance between two adjacent said teeth, each of said teeth rigidly connected to one of said profiles, only the rearmost of said ground wheels being connected to said power train whereby it is driven by said engine and the forward of said ground wheels is driven by said belt, said belt being embedded with longitudinally extending steel wires of such a character that it is relatively inelastic in the longitudinal direction, when the vehicle is moving forward the run of said belt contacting the ground being in a state of tension and said profiles exerting rearwardly and downwardly inclined forces on the soil in the upper layer of the ground of such a character that harmful packing disadvantageous to the soil is substantially reduced and scraping off of its upper layer is generally avoided.

* * * * *